United States Patent
Harriman et al.

(10) Patent No.: US 6,982,574 B2
(45) Date of Patent: Jan. 3, 2006

(54) METHOD OF FORMING A TRANSISTOR DRIVER AND STRUCTURE THEREFOR

(75) Inventors: Paul J. Harriman, Goodyear, AZ (US); Hsien-Te Kevin Shih, Glendale, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 10/805,405

(22) Filed: Mar. 22, 2004

(65) Prior Publication Data

US 2005/0206436 A1    Sep. 22, 2005

(51) Int. Cl.
*H03B 1/00*    (2006.01)
(52) U.S. Cl. .................................. 327/108; 327/172
(58) Field of Classification Search ............... 327/108, 327/112, 172–176, 427; 323/282, 284, 224; 318/599; 363/21.06, 21.1, 21.11, 21.14, 363/21.18
See application file for complete search history.

(56) References Cited

U.S. PATENT DOCUMENTS

| | | | |
|---|---|---|---|
| 6,466,462 B2 * | 10/2002 | Nishiyama et al. | 363/21.11 |
| 6,556,053 B2 * | 4/2003 | Stanley | 327/108 |
| 6,603,291 B2 * | 8/2003 | Wheeler et al. | 323/224 |
| 6,674,268 B2 * | 1/2004 | Rutter et al. | 323/224 |
| 6,870,354 B2 * | 3/2005 | Nishimaki | 323/284 |

OTHER PUBLICATIONS

Analog Devices, "Dual MOSFET Driver with Bootstrapping", ADP3410, Data Sheet, 2002.

* cited by examiner

*Primary Examiner*—My-Trang Nu Ton
(74) *Attorney, Agent, or Firm*—Robert F. Hightower

(57) ABSTRACT

In one embodiment, a power supply system has a transistor driver that receives a PWM signal and generates signals to drive output transistors of the power supply system in response to the PWM signal. If the PWM signal is low for a certain length of time, the transistor driver disables t least one of the output transistors.

15 Claims, 2 Drawing Sheets

METHOD OF FORMING A TRANSISTOR DRIVER AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to produce drivers for the switching transistors utilized in non-linear power supply controllers. In one particular type of controller, commonly referred to as a synchronous buck controller, two drivers were utilized to drive to power transistors. One power transistor was connected to switch a voltage to supply current to an inductor. The second transistor, often referred to as a synchronous rectifier, was connected to discharge the inductor. Both transistors typically were controlled by a pulse width modulated (PWM) power supply controller. One example of such a driver is known as the ADP3410 produced by Analog Devices of Norwood Mass. Under some conditions, the PWM controller would shutdown and stop providing PWM pulses to the drivers. When this occurred, the inductor would discharge through the synchronous rectifier transistor which would result in ringing that eventually caused the output voltage to be pulled below the ground potential of the system. Pulling the output voltage below ground often resulted in damage to the electronic components connected to the output of the power supply controller.

Accordingly, it is desirable to have a transistor driver that reduces ringing on the output when the PWM controller shuts down.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
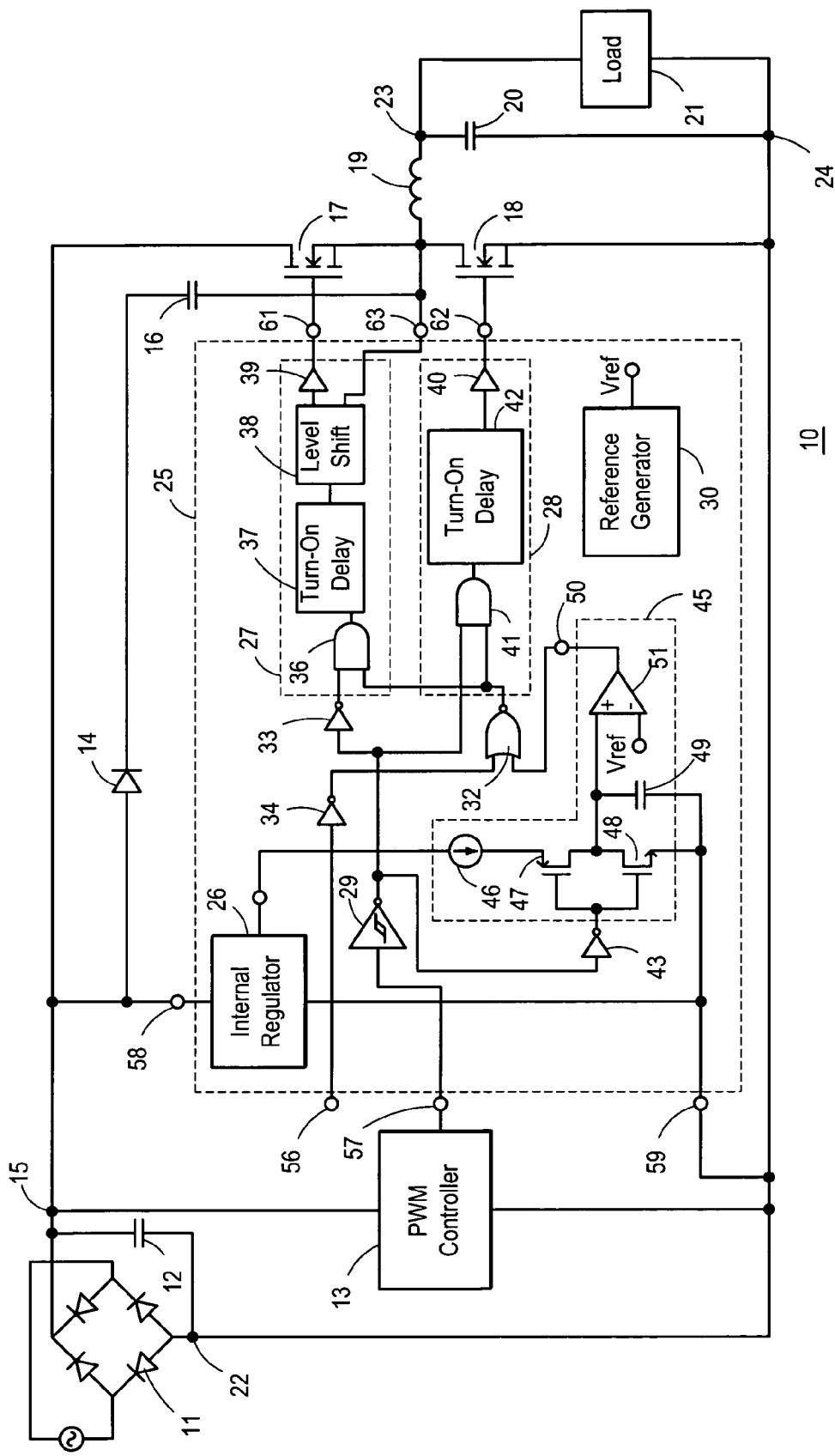
FIG. 1 schematically illustrates a portion of an embodiment of a power supply system having a transistor driver in accordance with the present invention.

FIG. 1 schematically illustrates an embodiment of a portion of a power supply control system 10 that includes a transistor driver 25 that substantially reduces ringing on outputs 23 and 24 of system 10. Other components typically are connected externally to driver 25 in order to provide functionality for system 10. For example, a bridge rectifier 11 which receives a source voltage from an ac source, such as a household mains, and provides a bulk voltage between outputs 15 and 22 of rectifier 11, a capacitor 12 that provides filtering for the bulk voltage, an isolation diode 14, a filter capacitor 16, a pulse width modulated (PWM) controller 13, an upper output transistor 17, a lower output transistor 18, an energy storage inductor 19, an output filter capacitor 20, and a load 21 typically are external to driver 25 and are illustrated to assist in the description of driver 25. Transistors 17 and 18 typically are switching power transistors. Transistor 18 often is referred to as a synchronous rectifier. In most embodiments, controller 13, transistors 17 and 18, diode 14, capacitors 12, 16 and 20, and inductor 19 are external to the semiconductor die on which driver 25 is formed. In some embodiments, either or both of controller 13 and transistors 17 and 18 may be included within driver 25. PWM controller 13 provides a series of pulse width modulated (PWM) pulses that are generated to regulate the output voltage between outputs 23 and 24. Controller 13 typically receives a feedback signal, not shown, that is representative of the output voltage in order to assist in generating the pulses. Such PWM controllers and feedback signals are a well known to those skilled in the art. One example of such a controller is disclosed in U.S. Pat. No. 6,429,709 issued to Hall et al on Aug. 6, 2002, which is hereby incorporated herein by reference.

Driver 25 includes an internal regulator 26, a disable circuit 45, a reference generator 30, an upper transistor control channel 27, a lower transistor control channel 28, and a receiver 29. Circuit 45, and channels 27 and 28 are illustrated in a general way by dashed boxes. Other features such as under voltage lock-out (UVLO) and over-temperature protection may also be included within driver 25 but are not shown for clarity of the explanation. Although the connections are not shown for clarity of the drawing, regulator 26 receives a supply voltage between a voltage input 58 and a voltage return 59, and provides an operating voltage for operating the internal elements of driver 25 including supplying an operating voltage for circuit 45, receiver 29, generator 30, and the logic elements within driver 25. Generator 30 provides a reference voltage Vref that is used by circuit 45. Receiver 29 of driver 25 receives a PWM signal or PWM pulses from controller 13 on a PWM input 57 of driver 25. In the preferred embodiment, receive 29 has hysteresis in order to provide noise immunity. The PWM signal on the output of receiver 29 is applied to both channels 27 and 28 and is also applied to circuit 45.

Channels 27 and 28 are used to form and appropriately time transistor drive signals on respective outputs 61 and 62 that are formed by driver 25 for enabling and disabling transistors 17 and 18, respectively. Channels 27 and 28 include respective turn-on delays 37 and 42 that ensure the active portion of the enabling portion of the transistor drive signals on outputs 61 and 62 do not overlap. Channel 27 also includes an AND gate 36, a level shifter 38 that shifts the voltage level to be suitable for driving transistor 17, and a buffer 39 that provides sufficient current to enable and disable transistor 17. Such turn-on delays and level shifters are well known to those skilled in the art. An input 63 provides a floating ground for operating transistor 17. Channel 28 also includes an AND gate 41 and a buffer 40 that provides sufficient current to enable and disable transistor 18. An enable input 56 of driver 25 can be used to disable channels 27 and 28, thus, disable both of respective transistors 17 and 18. If input 56 is low an inverter 34 applies a high to one input of an OR gate 32 driving the output of gate 32 low and the output of gates 36 and 41 low. The low from gates 36 and 41 drive outputs 61 and 62 low thereby disabling transistors 17 and 18, thus, disabling channels 27 and 28. If input 56 is high, inverter 34 applies a low to one input of gate 32 which allows the output of circuit 45 to control the enabling and disabling of channels 27 and 28. For the purpose of the following discussion, it is assumed that input 56 is high and that circuit 45 controls gate 32 and the enabling and disabling of channels 27 and 28.

Driver 25 is formed to provide a transistor drive signal on outputs 61 and 62 to enable transistor 17 and disable transistor 18, respectively, when the PWM signal is high and to provide a drive signal on outputs 61 and 62 to respectively disable transistor 17 and enable transistor 18 when the PWM signal is low. As will be seen hereinafter, circuit 45 is formed to disable channel 28 and transistor 18 when controller 13 has stopped issuing PWM pulses for at least a period of time. For example, controller 13 may detect that the bulk voltage has decreased below an acceptable level and may cease issuing PWM pulses.

Circuit 45 is formed to detect when input 57 has been in a low state for at least the specified period of time and responsively generate a disable signal that is used to at least disable transistor 18 and preferably both transistors 17 and 18. The disable signal is received by channel 27 which responsively generates the drive signal to disable transistor 17. The disable signal is also received by channel 28 which responsively generates the drive signal to disable transistor 18. Circuit 45 has a timer that establishes the time period. When the PWM signal received on input 57 is in a low state, the output of an inverter 43 is low which enables a transistor 47 to conduct current from a current source 46 and charge a capacitor 49. As long as input 57 remains low, the current from current source 46 continues charging capacitor 49. If input 57 remains low for longer than a first time period, capacitor 49 charges to a value that is greater than the reference voltage Vref thereby forcing output 50 high. Consequently, current source 46, capacitor 49, and comparator 51 form a timer. The high disable signal on output 50 is applied to an input of gate 32 thereby forcing the output of gate 32 low. The low from gate 32 forces the outputs of gates 36 and 41 low which disables channels 27 and 28 and forces outputs 61 and 62 low to form transistor drive signals that disable transistors 17 and 18. When the PWM signal received on input 57 goes high, transistor 48 is enabled to couple capacitor 49 to the voltage of return 59 and discharge capacitor 49 thereby resetting the timer of circuit 45. When the PWM signal on input 57 is high, the timer of circuit 45 is reset thereby restarting the timer and forcing output 50 low. The low from output 50 and the low from inverter 34 drive the output of gate 32 high and enable channels 27 and 28 to receive PWM pulses and provide drive signals on outputs 61 and 62 that responsively control the operation or state of transistors 17 and 18.

When the PWM signal is high, output 50 is low and the output of gate 32 is high. The high PWM signal, through receiver 29 and an inverter 33, forces the output of gate 36 high. The high propagates through turn-on delay 37, level shifter 38, and buffer 39 to drive output 61 high and enable transistor 17. Since the output of gate 32 is high, the high PWM signal also drives the output of gate 41 low. The low propagates through turn-on delay 42 and buffer 40 to force output 62 low thereby disabling transistor 18. Consequently, transistor 17 is turned-on and supplies current through inductor 19 to both charge capacitor 20 and supply a load current to load 21. When the PWM signal goes low, capacitor 49 is charging and output 50 is still low. The low PWM signal forces the output of inverter 33 low thereby applying a low to gate 36 which propagates through turn-on delay 37, level shifter 38, and buffer 39 to force output 61 low thereby disabling or turning-off transistor 17. The low PWM signal drives the output of gate 41 high. The high propagates through turn-on delay 42 and buffer 40 driving output 62 high and enabling or turning-on transistor 18. If the PWM signal transitions to a high before capacitor 49 charges to Vref, the PWM operation continues, otherwise, output 50 goes high and disables driver 25 from providing signals that are suitable for driving transistors 17 and 18.

Disabling transistor 18 after PWM controller 13 has stopped supplying drive pulses for a period of time ensures that transistor 18 turns-off and does not provide a discharge path from inductor 19 to return 59. Eliminating this discharge path substantial prevents output 23 from discharging below the value of return 59 thereby providing protection for load 21 and system 10. In one example embodiment, the first time period is established to be about five micro-seconds. However, the time period may be other durations. Additionally, capacitor 49 may be external to driver 25 in order to make the time period selectable. Those skilled in the art will realize that other circuits may be used to establish the first time period. For example, a digital counter and oscillator may be used instead of a capacitor.

In order to provide this functionality, input 57 is connected to an input of receiver 29. An output of receiver 29 is commonly connected to an input of gate 41 and an input of inverters 33 and 43. An output of inverter 43 is commonly coupled to the gate of transistors 47 and 48. Source of transistor 48 and is connected to return 59 and a drain of transistor 48 is connected to the source of transistor 46, a first terminal of capacitor 49, and a non-inverting input of comparator 51. A drain of transistor 47 is connected to a first terminal of current source 46 which has a second terminal connected to Regulator 26. A second terminal of capacitor 49 is connected to return 59. An inverting input of comparator 51 connected to the Vref output of generator 30, and an output of comparator 51 is connected to output 50 and to a first input of gate 32. A second input of gate 32 is connected to an output of inverter 34 which has an input connected to input 56. An output of gate 32 is connected to a first input of gate 41 and a first input of gate 36. Second input of gate 36 is connected to an output of inverter 33. An output from gate 36 connected to an input of the late 37 which has an output connected to an input of level shifter 38. The first output of level shifter 38 is connected to an input of buffer 39 which has an output connected to output 61. An output of gate 41 is connected to an input of delay 42 which has an output connected to an input of buffer 40. An output of buffer 40 is connected to an output 62. The second output of level shifter 38 is connected to an input 60.

Figure 2:
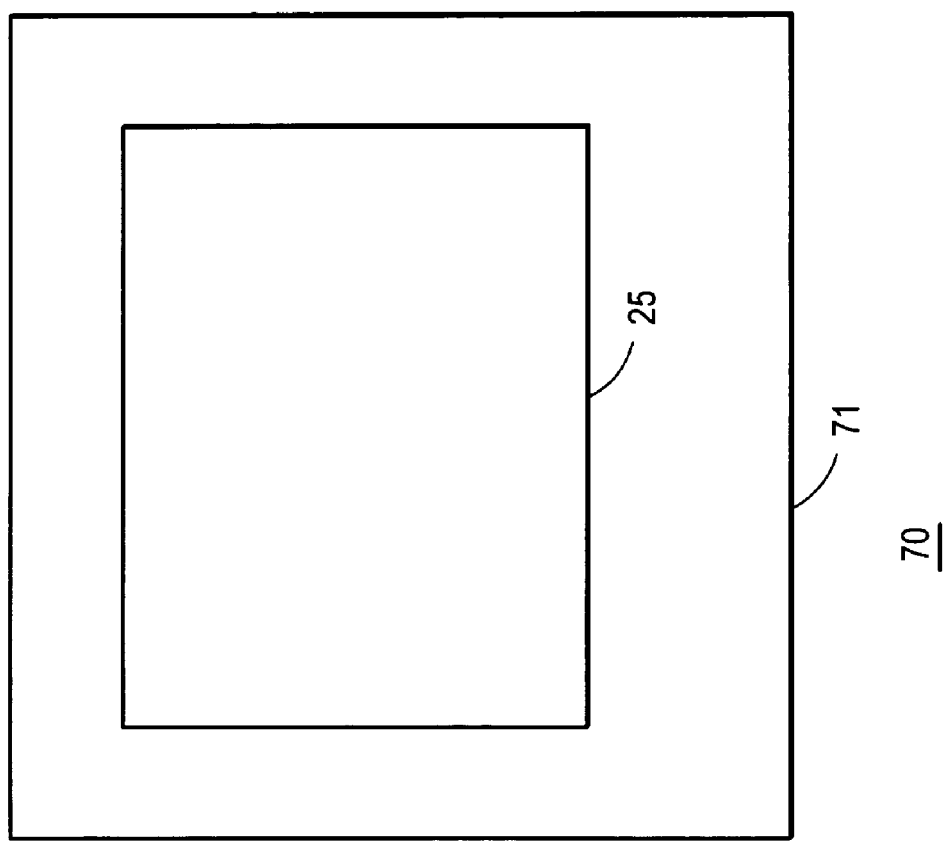
FIG. 2 schematically illustrates a plan view of a semiconductor device including a transistor driver in accordance with the present invention.

FIG. 2 schematically illustrates an enlarged plan view of a portion of an embodiment of a semiconductor device 70 that is formed on a semiconductor die 71. Driver 25 is formed on die 71. Die 71 may also include other circuits that are not shown in FIG. 2 for simplicity of the drawing. Driver 25 and device 70 are formed on die 71 by semiconductor manufacturing techniques that are well know to those skilled in the art.

In view of all of the above, it is evident that a novel device and method is disclosed. Included, among other features, is determining if a PWM controller stops issuing PWM pulses for a period of time and responsively forming a drive signal that disables an output transistor. Disabling the output transistor after the PWM controller stops issuing PWM pulses prevents the output from generating signals that go below ground thereby preventing damage to circuits connected to the output.

While the invention is described with specific preferred embodiments, it is evident that many alternatives and variations will be apparent to those skilled in the semiconductor arts. More specifically the invention has been described for a particular timing method is used to determine if the PWM controller has stopped issuing PWM pulses. Other circuits may be used to determine the time period.

What is claimed is:

1. A method of forming a synchronous rectifier driver comprising:
    coupling a disable circuit to receive a PWM signal and to responsively provide a disable signal when the PWM signal remains at a first state for at least a first time period;
    coupling a first control channel to receive the disable signal and responsive generate a first drive signal suitable for disabling a lower output transistor; and
    coupling the first control channel to receive the PWM signal and responsively generate the first drive signal suitable for enabling the lower output transistor when the PWM signal is at the first state for less than the first time period.

2. The method of claim 1 further including coupling a second control channel to receive the PWM signal and responsively provide a second enable signal suitable for enabling an upper output transistor when the PWM signal is at a second state.

3. The method of claim 1 further including coupling a second control channel to receive the disable signal and responsively generate a second drive signal suitable for disabling an upper output transistor.

4. A method of forming a synchronous rectifier driver comprising;
    coupling a disable circuit to receive a PWM signal and to responsively provide a disable signal when the PWM signal remains at a first state for at least a first time period and coupling the disable circuit to start a timer to generate the first time period when the PWM signal transitions from the first state to a second state; and
    coupling a first control channel to receive the disable signal and responsive generate a first drive signal suitable for disabling a lower output transistor.

5. The method of claim 4 wherein coupling the disable circuit to start the timer to generate the first time period includes coupling the disable circuit to receive the PWM signal and responsively couple a current source to charge a capacitor.

6. The method of claim 5 further including coupling the disable circuit to receive the transition from the second state to the first state and responsively couple the capacitor to a discharge voltage.

7. The method of claim 5 further including coupling the capacitor to a comparator.

8. A synchronous rectifier driver comprising:
    a disable circuit operable to receive a PWM signal and responsively generate a disable signal when the PWM signal remains in a first state for at least a first time period;
    an upper transistor control channel operable to provide a first drive signal suitable to enable a first output transistor when the PWM signal is at a second state; and
    a lower transistor control channel operable to provide a second drive signal suitable to enable a second output transistor when the PWM signal is at the first state for no greater than the first time period and operable to receive the disable signal and responsively provide a third drive signal suitable to disable the second output transistor.

9. The synchronous rectifier driver of claim 8 further including the upper transistor control channel operable to receive the disable signal and responsively disable the first output transistor.

10. The synchronous rectifier driver of claim 8 wherein the disable circuit operable to receive the PWM signal and responsively generate the disable signal when the PWM signal remains in a first state for at least the first time period includes the disable circuit operable to force the first drive signal and the second drive signal to a state suitable for disabling the first output transistor and the second output transistor.

11. The synchronous rectifier driver of claim 8 wherein the disable circuit includes a timer that generates the first time period wherein the timer is reset each time the PWM signal transitions from the first state to the second state.

12. A method of operating a power supply controller comprising:
    generating a PWM signal;
    enabling a first output transistor when the PWM signal is in a first state;
    enabling a second output transistor when the PWM signal is in a second state for less than a first time period; and
    disabling the second output transistor when the PWM signal is in the second state for at least the first time period.

13. The method of claim 12 wherein enabling the first output transistor when the PWM signal is in the first state includes enabling the first output transistor to supply current to an inductor.

14. The method of claim 13 wherein enabling the second output transistor when the PWM signal is in the second state includes enabling the second output transistor to sink current from the inductor.

15. The method of claim 12 further including disabling the first output transistor when the PWM signal is in the second state for at least the first time period.

* * * * *